United States Patent
Arndt et al.

(10) Patent No.: US 10,558,545 B2
(45) Date of Patent: *Feb. 11, 2020

(54) MULTIPLE MODELING PARADIGM FOR PREDICTIVE ANALYTICS

(71) Applicant: International Business Machines Corporation, Armonk, NY (US)

(72) Inventors: Karla K. Arndt, Rochester, MN (US); James M. Caffrey, Woodstock, NY (US); Keyur Patel, Poughkeepsie, NY (US); Aspen L. Payton, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

This patent is subject to a terminal disclaimer.

(21) Appl. No.: 13/686,389

(22) Filed: Nov. 27, 2012

(65) Prior Publication Data

US 2013/0086431 A1  Apr. 4, 2013

Related U.S. Application Data

(63) Continuation of application No. 13/026,351, filed on Feb. 14, 2011.

(51) Int. Cl.
*G06F 11/30* (2006.01)

(52) U.S. Cl.
CPC .................. *G06F 11/3089* (2013.01)

(58) Field of Classification Search
CPC ............. G06F 11/3089; G06F 11/008; G06F 11/3072; G06F 11/3447; G06F 11/3452
USPC ........................................... 702/183; 700/31
See application file for complete search history.

(56) References Cited

U.S. PATENT DOCUMENTS

| | | | |
|---|---|---|---|
| 3,795,008 A * | 2/1974 | Kolsrud et al. | 346/33 R |
| 7,050,956 B2 | 5/2006 | Uysal et al. | |
| 7,480,640 B1 | 1/2009 | Elad et al. | |
| 2003/0079160 A1* | 4/2003 | McGee et al. | 714/39 |
| 2006/0058898 A1 | 3/2006 | Emigholz et al. | |
| 2006/0293777 A1* | 12/2006 | Breitgand et al. | 700/108 |
| 2007/0028219 A1 | 2/2007 | Miller et al. | |

(Continued)

FOREIGN PATENT DOCUMENTS

| | | |
|---|---|---|
| CN | 2001142746 A | 5/2001 |
| CN | 2005316808 A | 11/2005 |

(Continued)

OTHER PUBLICATIONS

Definition of threshold by Merriam-Webster Dictionary.*
U.S. Appl. No. 13/026,351, entitled Multiple Modeling Paradigm for Predictive Analytics, filed Feb. 14, 2011.

*Primary Examiner* — Patrick Assouad
*Assistant Examiner* — Haidong Zhang
(74) *Attorney, Agent, or Firm* — Patterson + Sheridan, LLP

(57) ABSTRACT

Techniques are described for monitoring a performance metric. A multiple modeling approach is used to improve predictive analysis by avoiding the issuance of warnings during spikes which occur as a part of normal system processing. This approach increases the accuracy of predictive analytics on a monitored computing system, does not require creating rules defining periodic processing cycles, reduces the amount of data required to perform predictive modeling, and reduces the amount of CPU required to perform predictive modeling.

20 Claims, 5 Drawing Sheets

(56) References Cited

U.S. PATENT DOCUMENTS

| | | | |
|---|---|---|---|
| 2007/0083513 A1* | 4/2007 | Cohen | G06F 11/008 707/6 |
| 2007/0282777 A1 | 12/2007 | Guralnik et al. | |
| 2009/0030864 A1 | 1/2009 | Pednault et al. | |
| 2009/0099821 A1 | 4/2009 | Dhanekula et al. | |
| 2009/0099988 A1 | 4/2009 | Stokes et al. | |
| 2009/0157590 A1 | 6/2009 | Mijares et al. | |
| 2010/0082697 A1 | 4/2010 | Gupta et al. | |

FOREIGN PATENT DOCUMENTS

| | | |
|---|---|---|
| CN | 2009003742 A | 1/2009 |
| GB | 2410580 A | 8/2005 |
| JP | 2001142746 A | 5/2001 |
| JP | 2005316808 A | 11/2005 |
| WO | 2010032701 A1 | 3/2010 |

* cited by examiner

MULTIPLE MODELING PARADIGM FOR PREDICTIVE ANALYTICS

CROSS-REFERENCE TO RELATED APPLICATIONS

This application is a continuation of co-pending U.S. patent application Ser. No. 13/026,351 filed Feb. 14, 2011. The aforementioned related patent application is herein incorporated by reference in its entirety.

BACKGROUND

Embodiments of the invention are directed to techniques which may be used as part of a predictive modeling analysis. More specifically, embodiments of the invention provide methods and systems for evaluating performance metrics of a computing system using a multiple modeling paradigm.

In large scale computing deployments, one common resiliency problem is solving what is referred to as "soft failures," where a computing system does not crash, but simply stops working correctly or slows down to a point of being effectively non-functional. Predictive analysis is a technique used to identify when a current set of sampled metrics for a computing system indicates that a future event is likely to occur (e.g., to predict when a soft failure is likely to occur). Predictive analysis tools rely on historical data to derive a model of expected system behavior.

An important aspect of such tools is the capability to avoid false positives. A false positive occurs when the predictive analysis tool detects a problem and warns a user, but the behavior is actually normal system behavior. False positives can significantly reduce a user's confidence in the predictive analytics tool. In large computer systems, many tasks or jobs may be running whose behavior is "spikey," meaning the activity rate may vary drastically depending on workload and time of day, day of week, etc. Predictive analytic tools analyze historical data collected on a system and use machine learning algorithms to identify abnormal behavior on a system. For example, regular periodic processing (weekly, bi-weekly, monthly, etc.) can cause normal spikes in activity that could be erroneously identified as abnormal behavior by the predictive analytic tools. Jobs or processes which exhibit "spikey" behavior tend to generate false positives, because the spikes tend to exceed consumption thresholds set using average consumption rates. Further, the timing of a spike may not follow a pattern that is detectable by pattern recognition algorithms due to a varying number of days in the month, weekends, holidays, etc.

SUMMARY

One embodiment of the invention includes a method for monitoring a performance metric. This method may generally include determining a value of a performance metric for a current sampling period. Upon determining the value of the performance metric passes a threshold derived from a first model of expected behavior of the performance metric, the value of performance metric is evaluated according to a second model of expected behavior of the performance metric. And upon determining the value of the performance metric passes a threshold derived from the second model, an alert message is generated.

Another embodiment of the invention includes a computer-readable storage medium storing an application, which, when executed on a processor, performs an operation for monitoring a performance metric. The operation itself may generally include determining a value of a performance metric for a current sampling period. Upon determining the value of the performance metric passes a threshold derived from a first model of expected behavior of the performance metric, the value of performance metric is evaluated according to a second model of expected behavior of the performance metric. And upon determining the value of the performance metric passes a threshold derived from the second model, an alert message is generated.

Still another embodiment of the invention includes a system having a processor and a memory storing an application program, which, when executed on the processor, performs an operation for monitoring a performance metric. The operation itself may generally include determining a value of a performance metric for a current sampling period. Upon determining the value of the performance metric passes a threshold derived from a first model of expected behavior of the performance metric, the value of performance metric is evaluated according to a second model of expected behavior of the performance metric. And upon determining the value of the performance metric passes a threshold derived from the second model, an alert message is generated.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
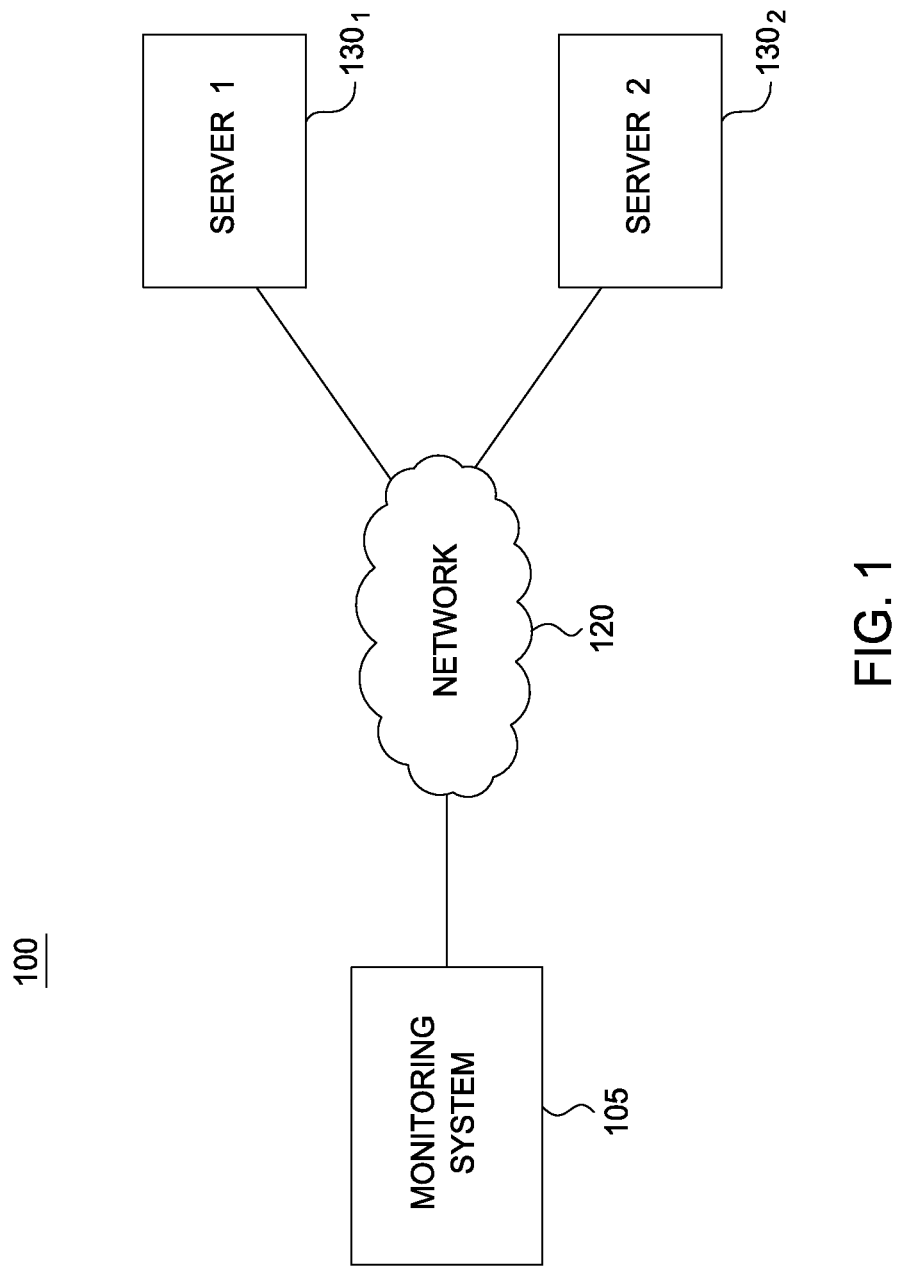
FIG. 1 illustrates an example computing infrastructure in which embodiments of the invention may be implemented.

As noted, some computing tasks can regularly exhibit so-called "spikey" behavior, where the amount of computing resources consumed by the computing task suddenly and dramatically change. For example, the amount of storage space, memory allocation, or CPU utilization, etc., can suddenly increase (or spike) as part of normal program operation. However, the same can occur when a process crashes (or otherwise operates abnormally). Accordingly, jobs or processes which exhibit "spikey" behavior make it challenging to determine whether a current spike in resource consumption (e.g., memory usage or processor utilization) indicates that something has gone wrong with a system function or with one of the jobs running on the system. That is, the problem could be rooted in something other than the job. For example, a communication device problem could cause a sudden increase in transaction response times. Thus, it is difficult for a predictive analysis tool to discern between a periodic spike in behavior resulting from the normal operations of a "spikey" job or process and an error condition that results in spikes in resource consumption.

Modeling these types of periodic behaviors frequently requires long-term retention of large volumes of historical data. Running modeling algorithms against very large amounts of data can consume unacceptable amounts of limited system resources both in terms of storage allocations and the time required to run the analysis against the historical data (which cuts into time available for regular computing tasks).

Embodiments of the invention provide methods and systems for evaluating performance metrics of a computing system using a multiple modeling paradigm. In one embodiment, system data for modeling a performance metric is stored as multiple groups: one group representing "standard" activity for a performance metric and one (or more) additional groups representing "spike" activity for the performance metric. The groups are modeled separately to allow for one prediction representing the "normal-standard" or expected value of the performance metric and for one (or more) predictions representing a "spike-standard" value of the metric expected during a spike. Doing so avoids issuing an erroneous exception when spikes occur, but still allows valid exceptions to be thrown when the value of the performance metric is outside of the modeled "spike-standard" value during a spike.

This approach greatly reduces the data retention requirements for the predictive analysis tool. Specifically, data used to model the "normal-standard" or standard value may be maintained for a shorter retention period. That is, historical data used to model resource consumption for non-spike periods (i.e., the "normal-standard") may be based on a relatively short time-window (e.g., a period of one month), while data used to model spike periods (i.e., the "spike-standard") can reach back over a much longer period (e.g., a period of one year) in order to retain a representative sample. However, as the spikes occur less frequently, storing longer periods of modeling data for the "spike normal") does not result in unacceptable amounts of storage resources to be dedicated to the predictive analysis tool. Further, storing the data in this manner also reduces overall processing time, since the "normal-standard" model is not based on a long-history of the values sampled for the performance metric.

Furthermore, in one embodiment, users can identify specific periods for modeling expected spikes in addition to the "normal-standard" and "spike normal" periods. For example, assume a user creates a recurring job or processing task performed at the $1^{st}$ day of each month, as well executes jobs or tasks that result in transient spikes in the relevant performance metric. In such a case, the predictive analysis tool could also create a model for the spikes that are known to occur at the beginning of each month, in addition to the "normal-standard" and transient "spike-standard" models. Doing so might be useful in cases where the known spike-periods result in resource consumptions levels that would still generate a false positive according to the "spike-standard" model.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access monitor applications or related data present in a cloud environment. For example, the monitoring application could monitor an amount of shared memory (or other resources) available to multiple virtual machine instances in a cloud-based server deployment.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention are described using an example of monitoring of a performance metric of a computing system over a data communications network. However, it should be understood that the techniques described herein for modeling a performance metric using data for multiple models may be adapted to a variety of purposes in addition to modeling performance metrics on computing systems. Further, in many cases, the predictive analysis tool may be executing on the computing system being monitored. That is, the predictive analysis tool may monitor resource performance metrics on a local computing system as well as resources and performance metrics on remote systems.

FIG. 1 illustrates an example computing infrastructure 100 in which embodiments of the invention may be implemented. As shown, the computing infrastructure 100 includes a monitoring system 105 and server systems $130_{1-2}$, each connected to a communications network 120. In this example, the monitoring system 105 communicates over the network 120 to monitor the ongoing state of the server systems 130. As one example, the monitoring system 105 could be configured to monitor the consumption of shared resources on each of the servers 130. Of course, the monitoring system 105 could be configured to monitor a variety of performance metrics related to the function of the server systems 130 (as well as performance metrics of the monitoring systems 105), e.g., CPU utilization, shared (or dedicated) storage consumption, virtual storage consumption, error message traffic, system message (console) traffic, latching (latches held/released), transaction response times, disk I/O response times, disk I/O activity (reads, writes, etc.). Further, one of ordinary skill in the art will recognize that the particular metrics may be selected as needed in a particular case.

Figure 2:
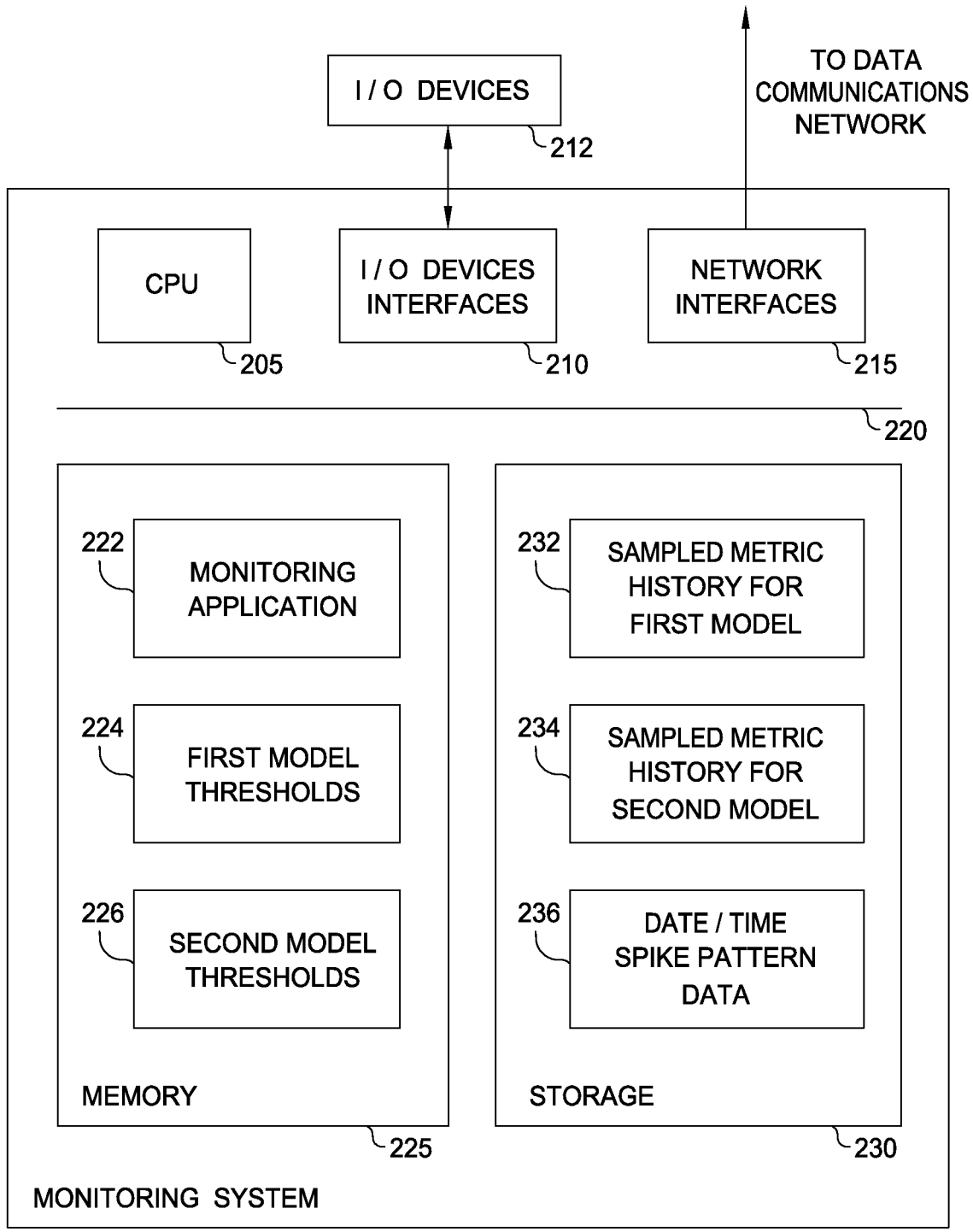
FIG. 2 illustrates an example computing system used to monitor performance metrics using a multiple modeling paradigm, according to one embodiment of the invention.

FIG. 2 illustrates an example computing system 200 that includes a monitoring application 222 used to monitor performance metrics using a multiple modeling paradigm, according to one embodiment of the invention. As shown, the computing system 200 includes, without limitation, a central processing unit (CPU) 205, a network interface 215, an interconnect 220, a memory 225, and storage 230. The computer system 200 may also include an I/O device interface 210 connecting I/O devices 212 (e.g., keyboard, display and mouse devices) to the computer system 200.

In general, the CPU 205 retrieves and executes programming instructions stored in the memory 225. Similarly, the CPU 205 stores and retrieves application data residing in the memory 225. The interconnect 220 provides a communication path for transmitting programming instructions and application data between the CPU 205, I/O devices interface 210, storage 230, network interface 215, and memory 225. CPU 205 is included to be representative of a single CPU, multiple CPUs, a CPU having multiple processing cores, and the like. And the memory 225 is generally included to be representative of a random access memory. The storage 230 may be a hard disk drive or solid state storage device (SSD). Further, although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 stores the monitoring application 222, along with first model thresholds 224 and second model thresholds 226. Storage 230 contains a sampled metric history 232 for a first model, a sampled metric history 234 for a second model, and optional date/time spike pattern data 236. In one embodiment, the monitoring application 222 is configured to generate an alarm (e.g., an alert message sent to a system administrator) when a performance metric exceeds (or in the appropriate case falls below) the thresholds specified by the first model thresholds 224 and second model thresholds 226. Further, the monitoring application 222 may be configured to derive values for thresholds 224, 226 using the sampled metric history 232 for the first model and using the sampled metric history 234 for the second model. For example, the first model thresholds 224 may provide an estimated maximum (or minimum) value for a performance metric based on sampled values not associated with a spike period. Accordingly, the sampled metric history 232 for the first model, i.e., for the "normal-standard" value, may include sample data covering a relatively recent history of sampled metric values (e.g., a period of four weeks).

At the same time, the sampled metric history 234 for the second model thresholds 226 may include data covering a relatively longer history of sampled metric values. However, the sampled metric history 234 for the second model is limited to data values sampled during periods where a spike in the performance metric is being observed. That is, the sampled metric history 234 is used to determine the appropriate "spike-standard" threshold.

In one embodiment, the monitoring application 222 initially establishes a base activity level of a performance metric using several hours of data collection (or days, as appropriate). If a spike occurs during this time it may slightly skew the calculation of expected activity for the "normal-standard" threshold, but generally not enough to affect the overall outcome.

Assume, e.g., a data collector samples a metric every 30 minutes for a two-week period and metrics are stored in a historical data file (i.e., as the sampled metric history 232 for the first model). Based on the data sampled over the two week period, the first metric threshold 224 is identified. At this point, until sufficient historical data has been collected, any spikes that occur would be identified as abnormal behavior and result in a warning. Accordingly, in one embodiment, any performance metric values that would trigger a warning are diverted to a separate historical data file for spike activity to avoid any additional skew to the calculations of standard normal behavior, i.e., performance metric values sampled during an observed spike period are diverted to sampled metric history 234 for the second model.

Thus, the sampled metric history 234 stores metric values which are high enough to cause a warning when compared to standard or "normal-standard" behavior. Once a sufficient number of metric values have been stored in the sampled metric history 234, predictive modeling algorithms may be used to determine a "spike-standard" value. For example, a sufficient amount of data may be considered to be spike data collected over a four-to-six week period which includes data for at least 3 occurrences of spike behavior. Of course, this training period may be adjusted depending on the requirements of the monitored system. That is, the monitoring application 222 may calculate a value which represents a metric value expected to see during a spike. Note, such a value may be specified as a single threshold (with some tolerance such as an expected standard deviation and variance), but may also be specified as a normal operating range, or in other forms appropriate for the particular performance metric.

At this point, the sampled metric history 232 and 234 data may be used to generate predictions of expected performance metric values. The first prediction represents the standard normal metric value and the additional predictions represent a normal metric value during a spike in activity. Based on these models, thresholds 224, 226 for each type of behavior can be programmatically generated. The sensitivity of the thresholds 224, 226 may be fine tuned by user configurable parameters.

Once the first and second model thresholds 224, 226 have been established, if an observed sample value for the performance metric exceeds the first model threshold 224, this sampled value may be stored in the sampled metric history 234 (and used to refresh the predictive model more frequently until regular activity has resumed). Further, if a subsequently observed sample value for the performance metric exceeds the second model threshold 226 during a spike period, then an alert message may be generated, e.g., a warning to the system operator so that action may be taken to prevent further complications. Of course, a broad variety of other actions could be trigged when the performance metric exceeds (or falls below) the first model threshold 224, the second model threshold 226, or both.

While the approach described above eliminates the need for advance user-knowledge and configuration in advance of a resource spike, in some cases, users may consistently schedule jobs or processing tasks in a manner that certain spike periods may be predicted. In such a case, the monitoring application 222 may be configured to create additional thresholds and sampled metric histories to model spike periods associated with specific jobs or tasks. For example, data/time spike pattern data may specify when a specific spike is expected to occur, and reoccur. Further still, the first and second thresholds may be dynamic once established. That is, once set to an initial value, subsequent sample values during both "normal" and "spike" periods may be used to update the thresholds over time.

Figure 3:
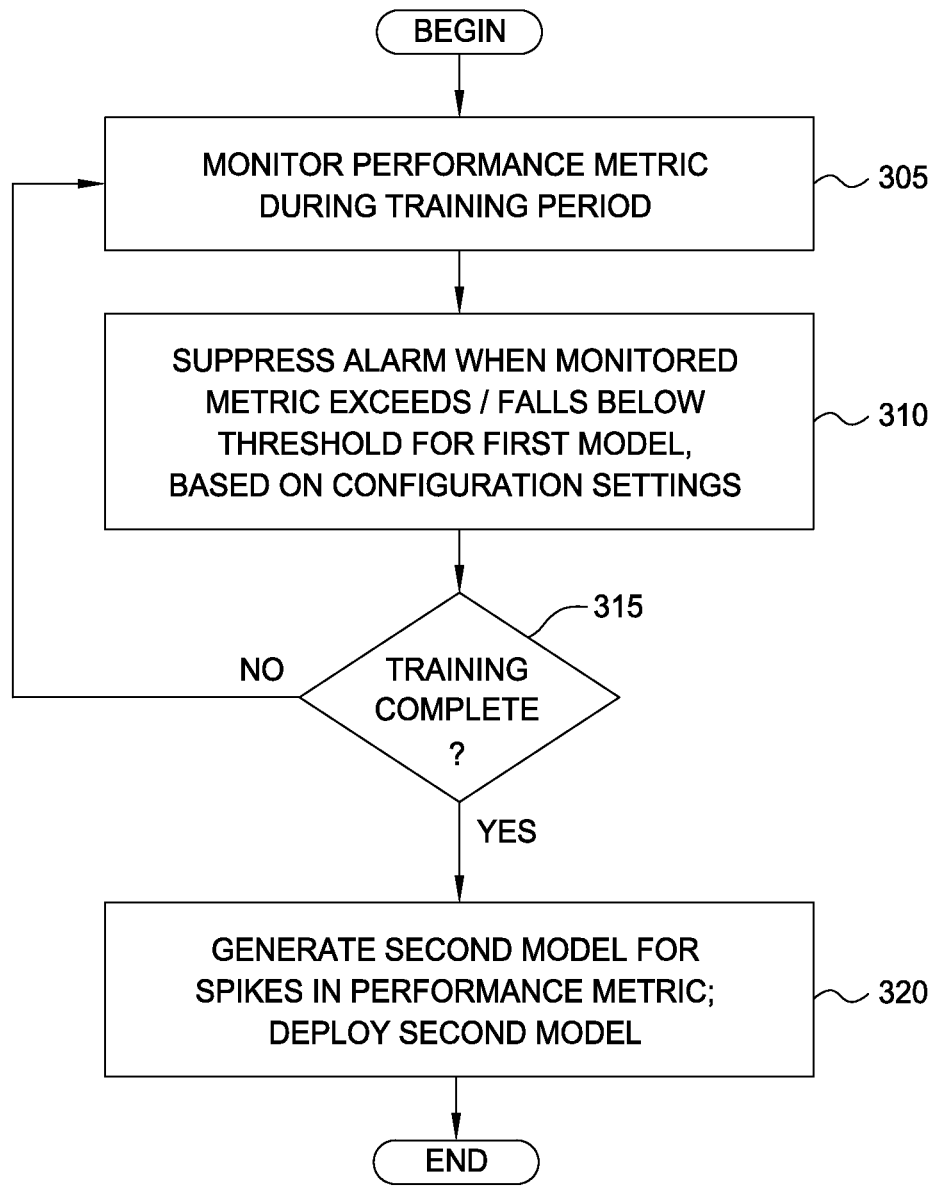
FIG. 3 illustrates a method for using a multiple modeling paradigm to monitor "spikey" computing jobs or processes, according to one embodiment of the invention.

FIG. 3 illustrates a method 300 for using a multiple modeling paradigm to monitor "spikey" computing jobs or processes, according to one embodiment of the invention. As shown, the method 300 begins at step 305, where a monitoring application begins monitoring a performance metric associated with a set of computing jobs or tasks for a training period. As noted, examples of a monitored performance metric can include a variety of aspects of a computing system, grid, cluster, network, etc., including, e.g., system utilization, processor (or processor core) utilization, shared (or dedicated) storage consumption, virtual storage consumption, error message traffic, system message (console) traffic, latching (latches held/released), transaction response times, disk I/O response times, disk I/O activity (reads, writes, etc.). The training period allows the monitoring system to determine both a first threshold (i.e., the normal-standard) but also determine a second threshold (i.e., the spike-standard).

At step 310, during the training period, the monitoring system suppresses any alarms when a sampled value of a monitored performance metric exceeds the value for the first threshold. This occurs because, while the first threshold (i.e., the normal-standard threshold) may be established relatively quickly (i.e., over a period of a few hours or days). Further, once established, the first threshold is used to identify periods where data used to model the second threshold is itself determined. For example, data for the second threshold may be limited to periods where the monitored performance metric exceeds the first threshold. (i.e., during a period of spike activity). At step 315, the monitoring system determines whether enough spike-data has been observed to determine the second threshold (i.e., the spike-standard threshold). Depending on the frequency and duration of spike periods, the training period may last for a period of weeks or months. After observing a representative sample of spike periods, the monitoring system determines a second model threshold for distinguishing between normal spikes in performance and events that may require user-intervention (step 320). That is, the monitoring system determines the second model thresholds.

Figure 4:
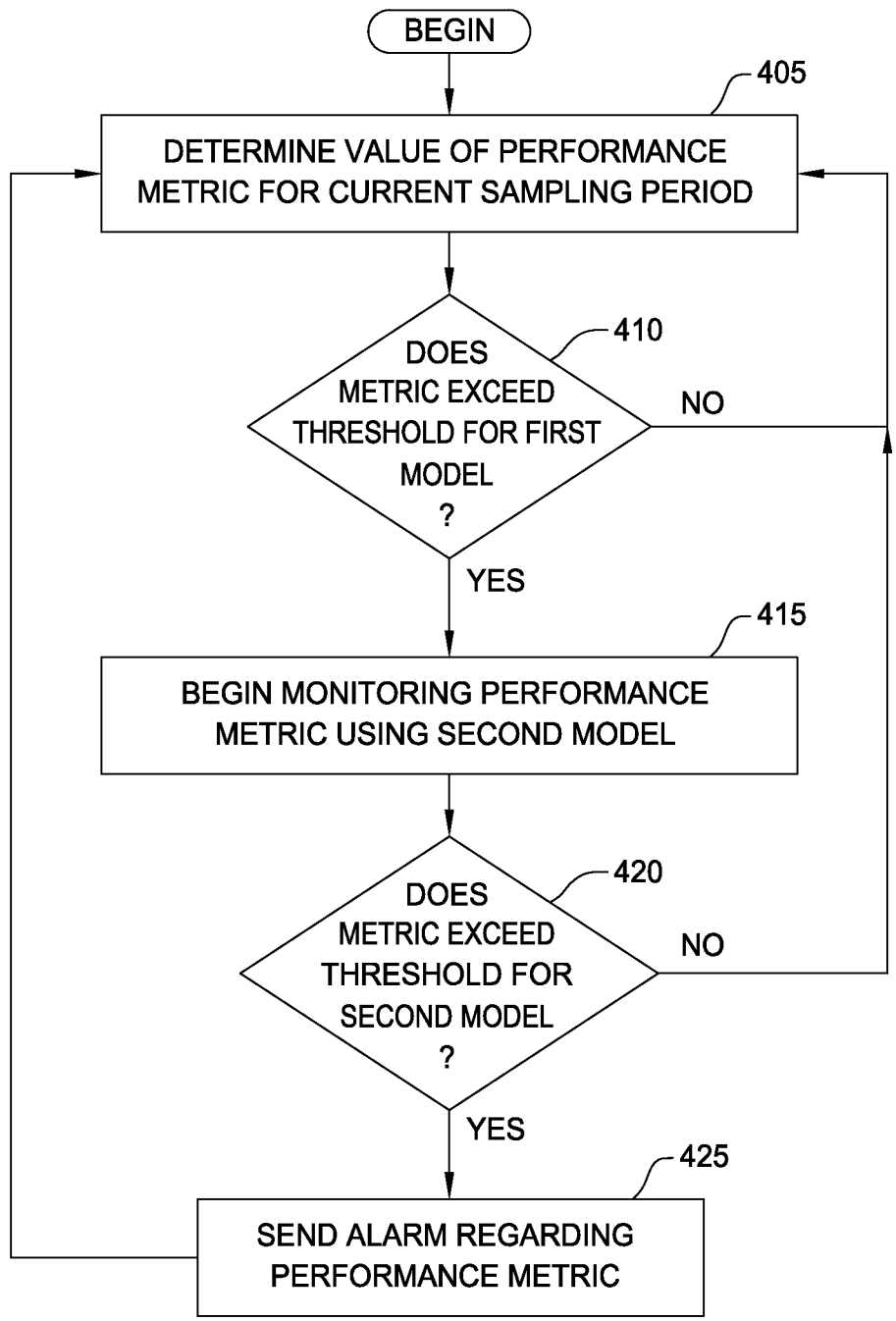
FIG. 4 illustrates a method for using a multiple modeling paradigm to perform a predictive analysis, according to one embodiment of the invention.

FIG. 4 illustrates a method 400 for using a multiple modeling paradigm to perform a predictive analysis, according to one embodiment of the invention. As shown, the method 400 begins at step 405 where the monitoring application determines a value of a performance metric for a current sampling period. Of course, the sampling frequency may be set as appropriate for the particular performance metric monitored by the monitoring system.

At step 410, the monitoring system determines whether the value of the performance metric sampled at step 405 exceeds (or in the appropriate case falls below) the threshold for the first model. If not, then the system returns to step 405 until reaching the time for the next sample period. Otherwise, in cases where the sampled performance metric value exceeds the threshold, the system begins evaluating the monitored metric using the second model. Note, in one embodiment, when a spike is observed, the sampling frequency may be increased (relative to the sampling frequency during non-spike periods) in order to monitor the performance metric more closely during a spike-period.

At step 420, if the performance metric exceeds the second threshold determined using the second model (i.e., the spike-standard threshold), then at step 425 an alarm message may be sent regarding the performance metric. Otherwise, if the evaluation of the performance metric indicates that the performance metric, while experiencing a spike, is experiencing a "normal" spike, then the system returns to step 405 to wait for the next sampling period.

Figure 5A:
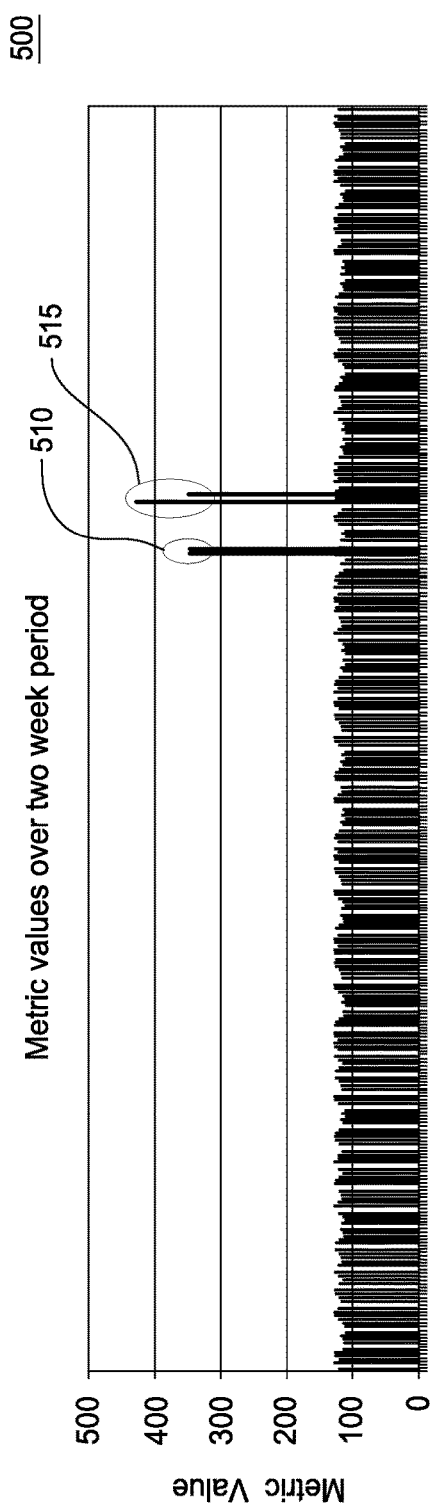
FIGS. 5A-5B illustrate an example data set monitored by a predictive analysis tool configured to use a multiple modeling paradigm, according to one embodiment of the invention.
Figure 5B:
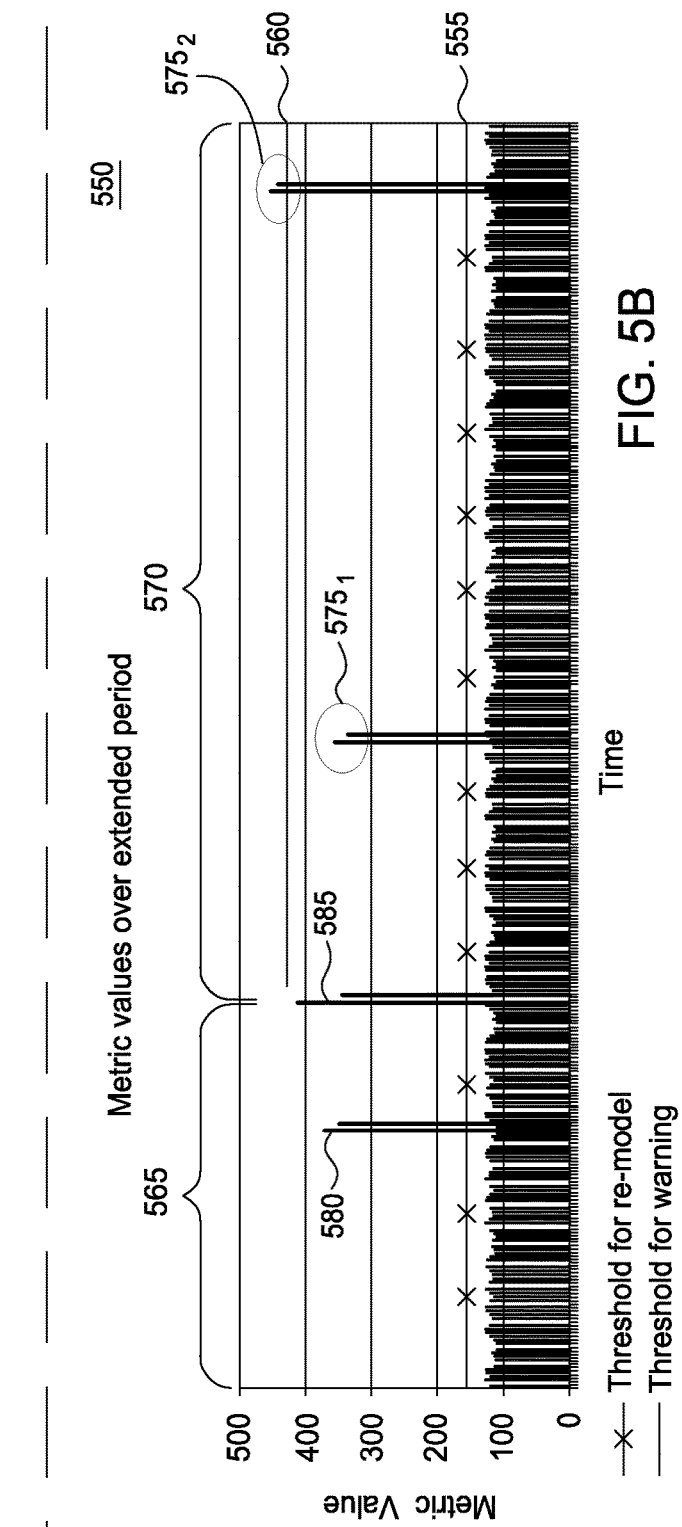

An example of the multiple-modeling approach is shown in FIGS. 5A-5B. More specifically, FIGS. 5A-5B illustrate example data sets monitored by a predictive analysis tool configured to use a multiple modeling paradigm, according to one embodiment of the invention. FIG. 5A shows samples 500 of a metric value obtained over a two week period. In this example, value of roughly ~100 is the generally obtained for the performance metric, except during two spikes 510, 515. Assume for this example, that the spike 510 results from normal activity of the computing system being monitored (via the performance metric) and that spike 515 results from a crash or other system malfunction. If a threshold for an alarm was set to ~150, then an alarm would be generated from both spike 510 (a false positive) and spike 515 (an actual problem). Accordingly, as described above, a multiple modeling approach may be used to model both so called "normal" values of the performance metric and a separate model to use for spike periods. This result is illustrated in FIG. 5B.

As shown in FIG. 5B, data 550 for the performance metric is captured for a larger time-period than shown in FIG. 5A. Additionally a first threshold 555 is set to roughly 150 and a second threshold 560 is set to roughly 425. During a training period 565, data for spikes 580, 585 is used to determine the value for the second threshold 560. Once training is complete, a spike $575_1$ does not generate an alarm, as it does not exceed the second threshold 560. In contrast, a spike $575_2$ does exceed the second threshold 560, and does result in an alarm.

Thus, advantageously, the multiple modeling approach described above improves predictive analysis by avoiding the issuance of warnings during spikes which occur as a part of normal system processing. This approach increases the accuracy of predictive analytics on a monitored computing system, does not require creating rules defining periodic processing cycles, reduces the amount of data required to perform predictive modeling, and reduces the amount of CPU required to perform predictive modeling.

While the foregoing is directed to embodiments of the present invention, other and further embodiments of the invention may be devised without departing from the basic scope thereof, and the scope thereof is determined by the claims that follow.

What is claimed is:

1. A computer-implemented method of separate modeling to reduce processing overhead in identifying performance spikes as false positives, the computer-implemented method comprising:
   training a first model by sampling a performance metric of a computing system over a first training period, in order to derive a first threshold, wherein the performance metric is sampled by a monitoring system via a network, wherein the computing and monitoring systems are distinct systems;
   training, based on the first threshold, a second model by sampling the performance metric only when the first threshold is exceeded, wherein the performance metric is sampled over a second training period longer in duration than the first training period, in order to derive a second threshold greater than the first threshold, wherein the first and second models comprise separate models;
   evaluating the performance metric of the computing system using the trained first model at a first sampling frequency, including determining that a first value of the performance metric exceeds the first threshold;
   upon determining that the first threshold is exceeded, beginning evaluation of the computing system using the trained second model at an increased sampling frequency relative to the first sampling frequency;
   upon determining, during the evaluation of the performance metric of the computing system using the trained second model, that a second value of the performance metric does not exceed the second threshold, identifying the second value as a false positive by a processor, wherein training the separate models for use in to identifying the second value as a false positive reduces a required number of sampled values relative to training a single model; and upon determining, during the evaluation of the performance metric of the computing system using the trained second model, that a third value of the performance metric exceeds the second threshold, identifying the third value as being indicative of a performance error on the computing system, and causing a remedial action to be taken on the computing system responsive to the performance error.

2. The computer-implemented method of claim 1, further comprising, upon determining the first value does not exceed the first threshold, updating the first model based on the first value.

3. The computer-implemented method of claim 1, further comprising, upon determining the first value exceeds the first threshold, updating the second model based on the first value.

4. The computer-implemented method of claim 1, wherein the performance metric corresponds to a usage of a shared resource.

5. The computer-implemented method of claim 1, wherein the performance metric corresponds to one of processor utilization, storage resource consumption, memory consumption, and message traffic.

6. The computer-implemented method of claim 1, wherein upon identifying the first value as a false positive, an indication that the first value is identified as a false positive is stored, wherein the third value is sampled only as a result of the increased sampling frequency, thereby avoiding a performance complication associated with a delayed remedial action absent measurement of the third value.

7. The computer-implemented method of claim 6, wherein the first value is determined by an application executing on the monitoring system, wherein the first and second thresholds are derived automatically from the first and second models, respectively.

8. The computer-implemented method of claim 7, further comprising:

dynamically updating the first threshold over time using the first model and without using the second model; and dynamically updating the second threshold over time using the second model and without using the first model.

9. The computer-implemented method of claim 8, wherein the second value is measured subsequent to measuring the first value, wherein the third value is measured subsequent to measuring the second value.

10. The computer-implemented method of claim 9, further comprising:

upon determining the first value does not exceed the first threshold, updating the first model based on the first value.

11. The computer-implemented method of claim 10, further comprising:

upon determining the first value exceeds the first threshold, updating the second model based on the first value.

12. The computer-implemented method of claim 11, wherein the performance metric corresponds to, in respective instances of executing the computer-implemented method, processor utilization, memory consumption, shared or dedicated storage consumption, virtual storage consumption, error message traffic, system message traffic, latches held, latches released, transaction response times, disk input/output (I/O) response times, and disk I/O activity.

13. The computer-implemented method of claim 12, wherein the computer-implemented method further comprises training a third model in addition to the first and second models, wherein the first training period is two weeks in duration, wherein the second training period is one year in duration, wherein the first sampling frequency comprises sampling every thirty minutes.

14. The computer-implemented method of claim 1, wherein the performance spikes are identified as not warranting any alert, using the first and second models.

15. The computer-implemented method of claim 1, wherein the performance metric corresponds to one of shared or dedicated storage consumption, virtual storage consumption, error message traffic, system message traffic, latches held, latches released, transaction response times, disk input/output (I/O) response times, and disk I/O activity.

16. The computer-implemented method of claim 1, wherein the second model is for transient spikes.

17. The computer-implemented method of claim 16, wherein the computer-implemented method further comprises training a known third model in addition to the first and second models.

18. The computer-implemented method of claim 1, wherein the second model is for known spike-periods.

19. The computer-implemented method of claim 1, wherein the first model models expected behavior of the computing system during non-spike and spike periods.

20. The computer-implemented method of claim 1, wherein the first model models expected behavior of the computing system during non-spike periods.

* * * * *